Aug. 13, 1940.  A. J. GRANBERG  2,211,417
ROTARY PUMP
Filed Sept. 7, 1937
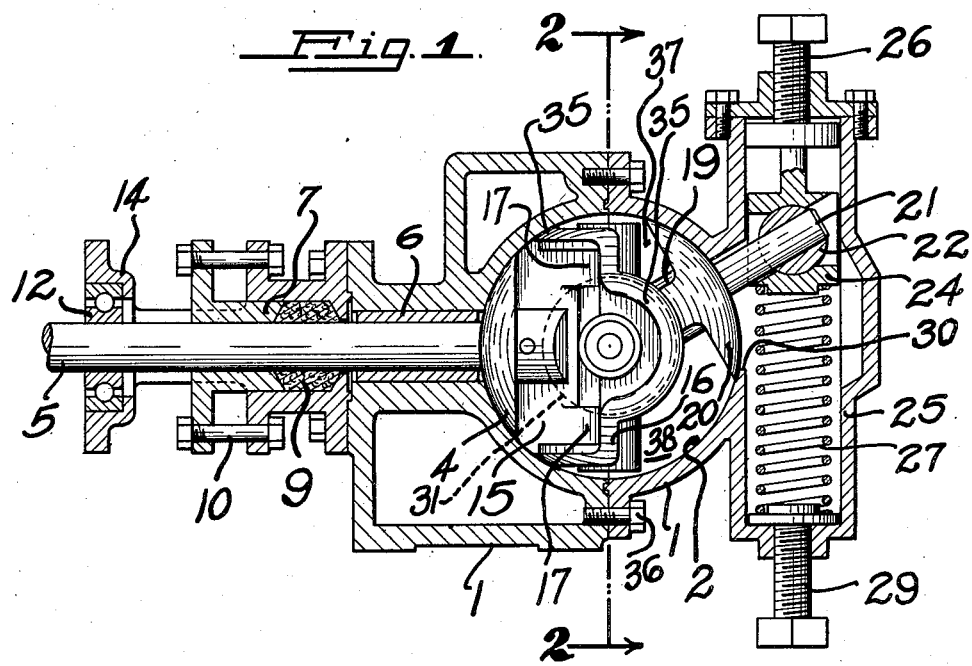
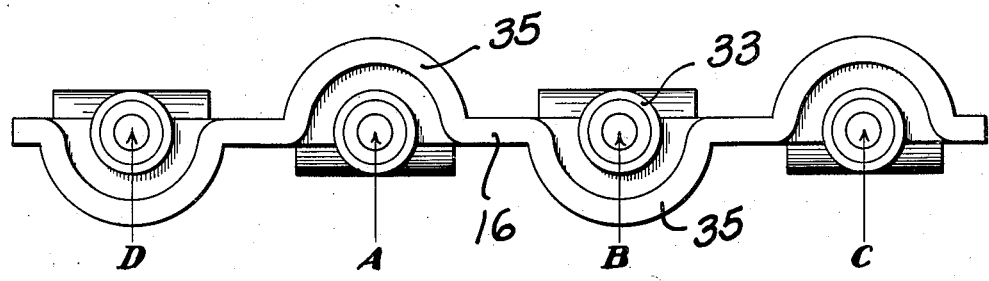
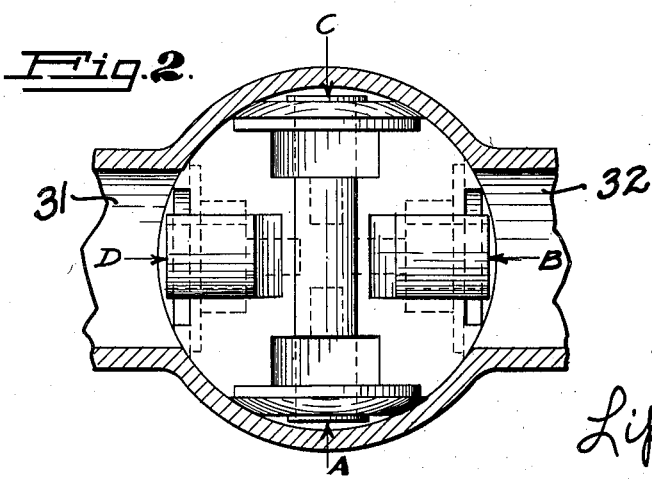
INVENTOR.
ALBERT J. GRANBERG.
BY
Lippincott & Metcalf
ATTORNEYS.

Patented Aug. 13, 1940

2,211,417

UNITED STATES PATENT OFFICE 2,211,417

ROTARY PUMP

Albert J. Granberg, Berkeley, Calif., assignor to Granberg Equipment Incorporated, Oakland, Calif., a corporation of California Application September 7, 1937, Serial No. 162,579

6 Claims. (Cl. 103—134)

My invention relates to pumps, and more particularly to a pump having a discoidal piston rotated in a spherical chamber.

Among the objects of my invention are: To provide a pump having a discoidal piston; to provide a four chamber pump with a single inlet and a single outlet; to provide a pump ideally adapted for pumping viscous liquids; to provide a pump with an automatic neutralizing device; to provide a pump utilizing a discoidal piston rotating in a spherical housing, utilizing the periphery of the piston as a valve; and to provide a simple, efficient pump, particularly adaptable for handling viscous liquids.

Other objects of my invention will be apparent or will be specifically pointed out in the description forming a part of this specification, but I do not limit myself to the embodiment of the invention herein described, as various forms may be adopted within the scope of the claims.

Referring to the drawing:

Fig. 1 is a view partly in longitudinal section and partly in elevation, of a preferred form of pump of my invention.

Fig. 2 is a view with the casing sectioned through the inlet and outlet ports, giving an elevational view of the discoidal piston.

Fig. 3 is a diagram illustrating a planar schematic development in elevation, of the periphery of the piston, looking toward the center thereof.

My invention may be more fully understood by a direct reference to the drawing:

A pump casing 1 is preferably formed in two halves to facilitate the machining of a spherical inner surface 2. A driving head 4 having the shape of a spherical segment is positioned within the chamber and has, extending outwardly therefrom, a driving shaft 5. This driving shaft is journaled in a casing bearing 6 close to the pump chamber, and this casing bearing is prolonged to terminate in a stuffing box assembly comprising a plunger 7 forced against packing 9 by packing bolts 10. The shaft continues, and I prefer to steady the outer end in an outboard bearing 12 mounted on a bracket 14.

Extending inwardly into the pump chamber from the driving head 4 is a pump chamber partition 15 attached to a discoidal piston 16 by hinges 17. In like manner a second pump chamber partition 19 is attached to discoidal piston 16 by similar hinges, and the second partition extends across the piston at right angles to the first piston. This second partition 19 is attached to a driven head 20, also having the shape of a spherical segment, and extending from the driven head is a stub shaft 21.

The end of stub shaft 21 is journaled in a ball 22, the ball being held in a ball cage 24 which is progressible along a cage cylinder 25 by an adjustment screw 26. The other end of the cage has bearing thereagainst a cage spring 27, the tension of which may be controlled by spring adjustment screw 29. The stub shaft 21 operates in casing slot 30 so that the angle of the stub shaft 21 may be varied with respect to the axis of driving shaft 5.

A single inlet port 31 is provided diametrically opposite a single outlet port 32, although it is to be distinctly understood that these ports are inlet or outlet ports only, in accordance with the direction the pump is to be rotated.

The periphery of the circular piston 16 has a peculiar shape, and it is shown in Fig. 3 laid out as a planar development. The periphery has a uniform width of bearing surface around the disc, and this bearing surface is of course a spherical surface so that the disc may both oscillate and rotate within the casing. Four portions of the periphery deviate to form semi-circular valve faces 35, each alternate surface extending in the opposite direction so that as the piston is rotated, each port 31 and 32 is opened into a chamber which is on an opposite side of the disc, and the fact that the periphery makes these semi-circular divergences allows me to place hinge pins A, B, C, and D in bosses 33 formed integral with the disc in diametrical locations and at right angles to each other, to form the main bearings of the toggle connecting the driving and driven head. Thus, the device may be easily assembled and disassembled when the split casing is separated by taking out the bolts 36.

If Fig. 1 be examined, it will be seen that on the left hand side of the piston both chambers are of equal size, with one chamber in the act of discharging while the other is filling, whereas on the right hand side of the disc, chamber 37 is closed and completely discharged and chamber 38 is open to its fullest extent and ready to start discharging its contents. Considering the port 32 facing the reader as the outlet port, the facing chamber on the left is half discharged, and as the periphery of the disc progresses across the port, chamber 38 will immediately start discharging into the facing port. There will therefore be a continuous inlet and a continuous outlet through the ports, thus providing for a flow which is sufficiently uninterrupted to allow the handling of highly viscous liquids.

Inasmuch as such viscous liquids are dangerous in case of outlet line stoppage, and, as a matter of fact, are thus dangerous because of their incompressibility, I have provided means of relieving pressures within the pump, and if the pressures do rise sufficiently high, a means for changing the angle of the rotating shaft to the point where the device will not pump at all but will simply rotate with all chambers half full. This is shown in detail in Fig. 1. When pressures rise in, for example, chamber 37, there will be a tendency for the driven shaft 21 to straighten out against spring 27. The arrangement shown allows the straightening out, and when shaft 21 is coaxially positioned in line with shaft 5, it is obvious that no pumping will take place and therefore no pressures develop.

Thus, I have provided the equivalent of an automatic safety valve, so that an abnormal rise in pressure will reduce the pump to a non-pumping condition. This ability to change the angle of shaft 21 also allows me to arrange the pump to have a variable output when rotated at a constant speed. I prefer, for certain liquids, to utilize an angle of 60° between the two shafts. If, however, I desire to reduce the output of the device, even though rotating at the same speed, I may change that angle by rotating adjustment screw 26, to decrease the angle between the shafts. Even under these circumstances the relief feature is still in operation, and the tension of the spring will be adjusted at any time by spring tension screw 29.

I have thus provided a toggle type pump having a discoidal piston operating in a spherical chamber, wherein the periphery of the disc acts as an automatic valve to control single inlet and outlet ports, thus adapting the pump for the handling of viscous liquids.

I have also provided a means to control the output of the pump, irrespective of speed of rotation, and have provided a simple and efficient means for preventing breakage of the pump in case output stoppage occurs.

I claim:

1. A continuous flow pump comprising a supporting housing, a spherical chamber therein, a drive shaft rotatably journaled into said chamber, a discoidal piston disposed diametrically within said chamber substantially normal to said drive shaft and forming a snug sliding fit with the interior wall of said chamber, means hingedly connecting said drive shaft to said discoidal piston on one face thereof along a diametrical axis, a stub shaft hingedly connected to the opposite face of said piston along a diametrical axis normal to said first axis and supported at an angle to said drive shaft, ports in said housing symmetrically disposed with respect to said drive shaft, said piston having an edge of substantially uniform width throughout its periphery with portions of said edge offset on a radius approximately that of said ports, whereby said offset portions when in registry with said ports will valve off that portion of said spherical chamber to one side of said piston and at the same time expose the full opening of said ports to that portion of said spherical chamber to the other side of said piston.

2. A continuous flow pump comprising a supporting housing, a spherical chamber therein, a drive shaft rotatably journaled into said chamber, a discoidal piston disposed diametrically within said chamber substantially normal to said drive shaft and forming a snug sliding fit with the interior wall of said chamber, means hingedly connecting said drive shaft to said discoidal piston on one face thereof along a diametrical axis, a stub shaft hingedly connected to the opposite face of said piston along a diametrical axis normal to said first axis and supported at an angle to said drive shaft, ports in said housing symmetrically disposed with respect to said drive shaft, said piston having an edge of substantially uniform width throughout its periphery with portions of said edge offset on a radius approximately that of said ports, whereby said offset portions when in registry with said ports will valve off that portion of said spherical chamber to one side of said piston and at the same time expose the full opening of said ports to that portion of said spherical chamber to the other side of said piston, said offset portions being concentric with said aforementioned diametrical axes.

3. A piston element for a continuous flow pump having a spherical pump chamber and circular inlet and outlet ports, comprising a discoidal member of substantially the diameter of said chamber and having a rim of substantially uniform width, with portions of said rim offset on a radius approximately equal to that of such ports.

4. A piston element for a continuous flow pump having a spherical pump chamber and an inlet and outlet port, comprising a discoidal member having a diameter substantially equal to that of such chamber and a rim of substantially uniform width, with portions of said rim alternately offset in opposite directions sufficient to substantially match the edge of said ports when in registry therewith.

5. A piston element for a continuous flow pump having a spherical pump chamber and an inlet and outlet port, comprising a discoidal member of substantially the diameter of such chamber and having a rim of substantially uniform width lying in the surface of a sphere, with portions of said rim offset to encompass such ports when in registry therewith.

6. A piston element for a continuous flow pump having a spherical pump chamber and an inlet and outlet port, comprising a discoidal member of substantially the diameter of such spherical chamber and having a pair of hinge bearings along diametrical axes normal to each other for hinge connection to a drive shaft and a stub shaft, said discoidal member also having a rim of uniform width, with spaced offset portions of substantially rim width concentric with said axes.

ALBERT J. GRANBERG.